United States Patent Office 3,432,552
Patented Mar. 11, 1969

3,432,552
DIHYDROTRICYCLOPENTADIENYLAMINE
AND PREPARATION THEREOF
Hans Kiefer, Paul Raff, and Ludwig Schuster, Ludwigshafen (Rhine), Germany, assignors to Badische Anilin- & Soda-Fabrik Aktiengesellschaft, Ludwigshafen (Rhine), Germany
No Drawing. Filed May 24, 1966, Ser. No. 552,440
Claims priority, application Germany, June 9, 1965, B 82,322
U.S. Cl. 260—563     3 Claims
Int. Cl. C07c 87/40, 85/00

This invention relates to a new amine, dihydrotricyclopentadienylamine, and its production.

It is known that olefins may be reacted with hydrocyanic acid and sulfuric acid according to the Ritter reaction to give N-formylamines. The corresponding amines are obtained from the reaction products by hydrolysis (cf. Houben-Weyl, "Methoden der Organischen Chemie," 4th edition, volume XI/1, pages 994 et seq., Stuttgart, 1957).

Diolefins have also already been converted according to the Ritter reaction into the corresponding diamines (cf. for example U.S. patent specifications 2,632,023 and 3,068,286 and British patent specification 681,688). It is also known that by using a large excess of hydrocyanic acid in the case of dicyclopentadiene the reaction remains confined to one of the two double bonds (Belgian patent specification 655,833). If this method known in connection with dicyclopentadiene be applied to tricyclopentadiene, which is a closely allied substance, the desired dihydrotricyclopentadienylamine is obtained in only relatively low yields.

It is an object of the invention to provide a new amine. It is a further object of the invention to provide a process for making the said amine.

We have found that dihydrotricyclopentadienylamine having the formula:

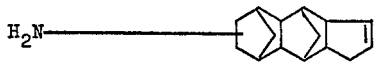

is obtained in high yields by reaction of tricyclopentadiene with hydrocyanic acid in the presence of concentrated sulfuric acid at a temperature of from —5° to +35° C. and hydrolysis of the resultant N-dihydrotricyclopentadienylformamide, by using hydrocyanic acid in at least a five-molar amount up to a twenty-molar amount with reference to tricyclopentadiene, using sulfuric acid in up to a twice-molar amount (also with reference to tricyclopentadiene) and carrying out the reaction in the presence of 1 to 3 moles of a di-n-alkyl ether per mole of tricyclopentadiene.

Under the said conditions, surprisingly, only one of the two double bonds contained in tricyclopentadiene reacts. It is not known into which of the two possible positions the amino group enters at this double bond.

The process according to this invention is carried out for example by placing sulfuric acid, for example 85 to 95%, particularly 90 to 92%, strength, part of the di-n-alkyl ether, for example 50 to 75% of the total amount and anhydrous hydrocyanic acid in a vessel in the stated ratios and slowly adding tricyclopentadiene dissolved in the remainder of the di-n-alkyl ether to the said mixture with intense mixing. The n-dialkyl ethers used may have identical or different alkyl radicals, those having a total of six to ten carbon atoms being in general preferred. For example di-n-propyl ether, di-n-butyl ether, di-n-amyl ether or ethyl-n-hexyl ether are suitable. The process may be carried out for example batchwise in a stirred vessel or continuously for example in an endless tube system where a fine distribution of the reactants is achieved by the strong turbulence in the circulation tube. The process is in general carried out at atmospheric pressure. In some cases, for example when an endless tube system is used, it is better to use superatmospheric pressure, for example up to 5 atmospheres gauge. The heat of reaction is carried away in each case by appropriate cooling means. After all of the tricyclopentadiene has been supplied to the reaction mixture, the latter is kept at the reaction temperature or at room temperature advantageously for some hours, for example two to five hours, while continuing mixing.

The reaction mixture is worked up in a manner conventionally used for working up reaction mixtures obtained by the Ritter reaction and as described for example in Houben-Weyl on the pages already mentioned above; for example water, e.g. in an amount of 0.4 to 2 parts per part of reaction mixture, is added and the excess hydrocyanic acid is distilled off. The residue is made alkaline with caustic soda solution and advantageously heated for some time, for example one hour, at 80° to 90° C. The amine thus separates together with the di-n-alkyl ether and may be isolated in the usual way, for example by distillation.

Dihydrotricyclopentadienylamine is a vulcanization accelerator.

The invention is further illustrated by the following examples. The parts given in the examples are parts by weight.

Example 1

A mixture of 130 parts of di-n-butyl ether and 486 parts of hydrocyanic acid in 212 parts of 90% sulfuric acid is placed in a stirred vessel having a high speed stirrer. While stirring intensely, a solution of 198 parts of tricyclopentadiene in 65 parts of di-n-butyl ether is added within thirty minutes, the temperature being kept at 15° C. by external cooling. The reaction mixture is allowed to continue reacting for another four hours at room temperature, diluted with 1000 parts of water and 450 parts of hydrocyanic acid is distilled off. The residue has 2800 parts of 25% caustic soda solution added to it and it is then heated for one hour at 80° to 90° C. The amine separates together with the di-n-butyl ether and is purified by distillation after it has been dried. Besides 167 parts of di-n-butyl ether, 163 parts of dihydrotricyclopentadienylamine is obtained having a boiling point of 93° to 100° C. and 0.1 mm. Hg and an amine number of 257 (theory for the monoamine 261; for the corresponding diamine 484). The yield is therefore 76% of the theory.

Example 2

For comparison, 396 parts of tricyclopentadiene in the molten state is slowly added within ninety minutes at 3° to 6° C. to a mixture of 654 parts of 90% sulfuric acid and 648 parts of hydrocyanic acid with intense stirring. The temperature of the mixture is allowed to rise to 20° C. and the reaction mixture is stirred for three hours at 20° to 30° C. It is diluted with 2000 parts of water and then distilled. 580 parts of hydrocyanic acid is recovered. The acid solution is made alkaline with concentrated caustic soda solution and the oil which separates is taken up in 400 parts of cyclooctylamine. The aqueous solution is extracted again with 400 parts of cyclooctylamine. The organic phases are combined, dried and worked up by distillation. In addition to the cyclooctylamine used for extraction, 422 parts of a mixture of dihydrotricyclopentadienylamine and tetrahydrotricyclopentadienylamine is obtained having a boiling point of 95° to 155° C. at 0.1 mm. Hg. The amine number of the mixture is 381 (theory for monoamine 261; for the corresponding diamine 484).

Example 3

100 parts of raw rubber, 1 part of stearic acid, 40 parts of active carbon black, 3 parts of naphthenic plasticizer, 5 parts of zinc oxide, 2 parts of sulfur and 2 parts of dihydrotricyclopentadienylamine are vulcanized in a press at 133° C. for eighty minutes. The test specimen has the following properties:

| | | |
|---|---|---|
| Stress value at 300% elongation (modulus 300) | kg./sq. cm | 60 |
| Break resistance | kg./sq. cm | 250 |
| Elongation | percent | 675 |
| Residual elongation one minute after break | do | 18 |
| Resilience | do | 43 |
| Hardness | Shore A° | 52 |

We claim:
1. A dihydrotricyclopentadienylamine having the formula:

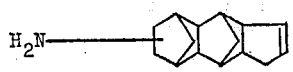

2. A process for the production of dihydrotricyclopentadienylamine which comprises reacting each mole of tricyclopentadiene with at least five moles up to twenty moles of hydrocyanic acid and an excess of sulfuric acid of up to two moles in the presence of one to three moles of a di-n-alkyl ether at a temperature of from $-5°$ to $+35°$ C. and hydrolyzing the resultant N-dihydrotricyclopentadienylformamide.

3. A process as claimed in claim 2, in which a sulfuric acid having a concentration of 85 to 95% by weight is used.

References Cited

Badische Anilin, Chem. Abst., vol. 65, 1966, p. 15250a.
Fr. 1482396, French Pat. Abst., vol. 7, #26, July 3, 1967, p. 1:3.

CHARLES B. PARKER, *Primary Examiner.*

P. C. IVES, *Assistant Examiner.*

U.S. Cl. X.R.
260—551, 795